US008754156B2

(12) United States Patent
Tsuchida et al.

(10) Patent No.: US 8,754,156 B2
(45) Date of Patent: Jun. 17, 2014

(54) METHOD FOR PRODUCING THIOESTER GROUP-CONTAINING ORGANOSILICON COMPOUND, THIOESTER GROUP-CONTAINING ORGANOSILICON COMPOUND, COMPOUNDING AGENT FOR RUBBER, RUBBER COMPOSITION, AND TIRE

(75) Inventors: Kazuhiro Tsuchida, Annaka (JP); Munenao Hirokami, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/471,919

(22) Filed: May 15, 2012

(65) Prior Publication Data

US 2012/0296023 A1 Nov. 22, 2012

(30) Foreign Application Priority Data

May 16, 2011 (JP) ................................. 2011-109413

(51) Int. Cl.
C07F 7/18 (2006.01)
C08K 5/548 (2006.01)
C08L 7/00 (2006.01)

(52) U.S. Cl.
USPC ........................... 524/262; 556/429; 106/481

(58) Field of Classification Search
None
See application file for complete search history.

(56) References Cited

U.S. PATENT DOCUMENTS

| | | | | |
|---|---|---|---|---|
| 3,768,537 A * | 10/1973 | Hess et al. | | 152/209.5 |
| 3,853,692 A * | 12/1974 | Clayton et al. | | 523/216 |
| 3,922,436 A | 11/1975 | Bell et al. | | |
| 3,922,466 A * | 11/1975 | Bell et al. | | 428/388 |
| 4,076,550 A | 2/1978 | Thurn et al. | | |
| 5,916,973 A * | 6/1999 | Zimmer et al. | | 525/236 |
| 6,229,036 B1 | 5/2001 | Batz-Sohn et al. | | |
| 6,414,061 B1 | 7/2002 | Cruse et al. | | |
| 6,608,125 B2 * | 8/2003 | Cruse et al. | | 524/262 |
| 6,777,569 B1 | 8/2004 | Westmeyer et al. | | |
| 7,199,256 B2 | 4/2007 | Yanagisawa et al. | | |
| 7,217,751 B2 | 5/2007 | Durel et al. | | |
| 7,301,042 B2 * | 11/2007 | Cruse | | 556/429 |
| 7,423,165 B2 | 9/2008 | Korth et al. | | |
| 7,718,819 B2 * | 5/2010 | Chaves et al. | | 556/427 |
| 2005/0245754 A1 | 11/2005 | Glatzer et al. | | |
| 2009/0061117 A1 * | 3/2009 | Oyama et al. | | 428/1.54 |
| 2009/0137730 A1 * | 5/2009 | Kameda et al. | | 524/580 |
| 2010/0317778 A1 * | 12/2010 | Gerster et al. | | 524/133 |
| 2011/0287369 A1 * | 11/2011 | Shibayama et al. | | 430/316 |

FOREIGN PATENT DOCUMENTS

| | | |
|---|---|---|
| JP | 51-20208 B | 6/1976 |
| JP | 2002-145890 A | 5/2002 |
| JP | 2004-18511 A | 1/2004 |
| JP | 2004-525230 A | 8/2004 |
| JP | 2005-8639 A | 1/2005 |
| JP | 2008-150546 A | 7/2008 |
| JP | 2010-132604 A | 6/2010 |
| JP | 4571125 B2 | 10/2010 |

OTHER PUBLICATIONS

Extended European Search Report issued Sep. 4, 2012, in European Patent Application No. 12168340.3.
Tempetini el al., "A simple asylation of thiols with anhydrides," Tetrahedron Letters (2010). vol. 51, pp. 5368-5371.

* cited by examiner

*Primary Examiner* — Robert S Loewe
(74) *Attorney, Agent, or Firm* — Birch, Stewart, Kolasch & Birch, LLP

(57) ABSTRACT

A new method for producing a thioester group-containing organosilicon compound by a convenient reaction with dramatically improved workability generating reduced byproduct is provided. The method comprises reacting an organosilicon compound having a hydrolyzable silyl group and mercapto group with a carboxylic anhydride. Also provided are an organosilicon compound having a hydrolyzable silyl group, a thioester group, and carboxyl group in the same molecule capable of remarkably reducing hysteresis loss of the cured rubber composition; a compounding agent for rubber containing such organosilicon compound; a rubber composition prepared by blending such compounding agent for rubber; and a tire produced by using the cured rubber composition are also provided.

7 Claims, No Drawings

METHOD FOR PRODUCING THIOESTER GROUP-CONTAINING ORGANOSILICON COMPOUND, THIOESTER GROUP-CONTAINING ORGANOSILICON COMPOUND, COMPOUNDING AGENT FOR RUBBER, RUBBER COMPOSITION, AND TIRE

CROSS-REFERENCE TO RELATED APPLICATION

This non-provisional application claims priority under 35 U.S.C. §119(a) on Patent Application No. 2011-109413 filed in Japan on May 16, 2011, the entire contents of which are hereby incorporated by reference.

TECHNICAL FIELD

This invention relates to a novel method for producing an organosilicon compound having a hydrolyzable silyl group and a thioester group in its molecule with a reduced byproduct generation. This invention also relates to an organosilicon compound containing a hydrolyzable silyl group, a thioester group, and carboxyl group in the same molecule, a compounding agent for rubber containing such organosilicon compound, a rubber composition prepared by blending such compounding agent for rubber, and a tire prepared by using such rubber composition.

BACKGROUND ART

Sulfur-containing organosilicon compounds are useful as a component for blending in silica-reinforced rubber composition used for the production of a tire. The silica-reinforced tire exhibits improved properties, and in particular, improved abrasion resistance, rolling resistance, and wet grip in automobile applications. These properties are closely related to the improvement of the low fuel consumption property of the tire, and active studies have been carried out.

As described above, increase in the silica content in the rubber composition is required for the realization of the low fuel consumption. However, silica-reinforced rubber compositions suffered from high viscosity before the vulcanization, and this resulted in the need of multiple-step kneading and low workability despite the decrease of the rolling resistance and the increase of the wet grip of the tire. Accordingly, a rubber composition prepared by simply blending an inorganic filler such as silica suffered from the problems of insufficient filler dispersion which resulted in the drastic loss of strength at breakage and abrasion resistance. In view of such situation, a sulfur-containing organosilicon compound had been required for improving the dispersibility of the inorganic filler in the rubber and realizing chemical bonding of the filler with the rubber matrix.

Examples of the known effective sulfur-containing organosilicon compound include a compound containing an alkoxysilyl group and a polysulfide silyl group in the molecule, for example, bis-triethoxysilylpropyl tetrasulfide and bis-triethoxysilylpropyl disulfide.

In addition to the organosilicon compound having a polysulfide group, also known are thioester-type organosilicon compound containing capped mercapto group which is advantageous for silica dispersion; and sulfur-containing organosilicon compound having an aminoalcohol compound transesterified to the hydrolyzable silyl group moiety which is advantageous in view of the affinity for silica by hydrogen bond.

However, a rubber composition for tire which has realized the desired low fuel consumption has not yet been realized by the use of such sulfur-containing organosilicon compounds. Examples of the remaining problems include higher cost compared to the sulfide-type compound and insufficient productivity due to the complicated production method.

The following literatures disclose prior art technologies relating to the present invention.

CITATION LIST

Patent Document 1: JP-B S51-20208
Patent Document 2: JP-T 2004-525230
Patent Document 3: JP-A 2004-18511
Patent Document 4: JP-A 2005-8639
Patent Document 5: JP-A 2002-145890
Patent Document 6: JP-A 2008-150546
Patent Document 7: JP-A 2010-132604
Patent Document 8: JP 4571125
Patent Document 9: USSN 2005/0245754
Patent Document 10: U.S. Pat. No. 6,229,036
Patent Document 11: U.S. Pat. No. 6,414,061

SUMMARY OF INVENTION

The present invention has been completed in view of the situation as described above, and an object of the present invention is to solve the problems of the prior art and provide a new method for producing a thioester group-containing organosilicon compound which can dramatically improve workability by a simple reaction which generates reduced byproducts. Another object of the present invention is to provide a compounding agent for rubber containing an organosilicon compound having a hydrolyzable silyl group, a thioester group, and carboxyl group in the same molecule which is capable of remarkably reducing hysteresis loss of the cured rubber composition. A further object of the present invention is to provide a rubber composition prepared by blending such compounding agent for rubber, and a tire produced by using the cured rubber composition.

In order to achieve the objects as described above, the inventors of the present invention made an intensive study and found a new method for producing a thioester group-containing organosilicon compound wherein an organosilicon compound having a hydrolyzable silyl group and mercapto group is reacted with a carboxylic anhydride, and also, that this method does not require treatment of the waste acid compound and salt filtration as required in the prior art method, and that the byproducts are reduced. The inventors also found that a rubber composition prepared by using a compounding agent for rubber mainly comprising an organosilicon compound having a hydrolyzable silyl group, a thioester group, and carboxyl group in the same molecule satisfies the requirements of low fuel consumption tires. The present invention has been completed on the bases of such findings.

Accordingly, the present invention provides a method for producing a thioester group-containing organosilicon compound, a thioester group-containing organosilicon compound, a compounding agent for rubber, a rubber composition, and a tire as described below.

[1] A method for producing a thioester group-containing organosilicon compound by reacting (a) an organosilicon compound having mercapto group and a hydrolyzable silyl group and (b) a carboxylic anhydride, wherein the thioester group-containing organosilicon compound is represented by the following general formula (1):

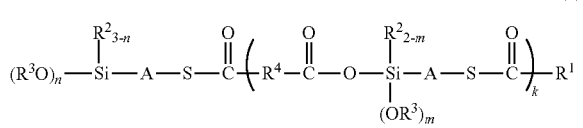

(1)

wherein $R^1$ an unsubstituted monovalent hydrocarbon group or a substituted monovalent hydrocarbon group having the substituent which is at least one member selected from carboxyl group, metal carboxylate salt group, and carboxylate ester group; $R^2$ is independently an alkyl group containing 1 to 10 carbon atoms or an aryl group containing 6 to 10 carbon atoms; $R^3$ is independently an alkyl group containing 1 to 20 carbon atoms which may contain an intervening oxygen atom, an alkenyl group containing 2 to 10 carbon atoms, aryl group containing 6 to 10 carbon atoms, or an acyl group containing 1 to 20 carbon atoms; A is a straight, branched, or cyclic divalent hydrocarbon group; n is an integer of 1 to 3; $R^4$ is a divalent hydrocarbon group; m is 0, 1, or 2; and k is an integer of 0 to 10.

[2] A method for producing a thioester group-containing organosilicon compound according to [1] wherein the organosilicon compound (a) is one represented by the following formula (a):

(a)

wherein $R^2$ is independently an alkyl group containing 1 to 10 carbon atoms or an aryl group containing 6 to 10 carbon atoms, $R^3$ is independently an alkyl group containing 1 to 20 carbon atoms optionally intervened by oxygen atom, an alkenyl group containing 2 to 10 carbon atoms, an aryl group containing 6 to 10 carbon atoms, or an acyl group containing 1 to 20 carbon atoms, A is a straight, branched, or cyclic divalent hydrocarbon group, and n is an integer of 1 to 3, and the carboxylic anhydride is represented by the following formula (b-1) or (b-2):

(b-1)

(b-2)

wherein R' is a monovalent hydrocarbon group containing 1 to 20 carbon atoms, and Z is a divalent hydrocarbon group containing 2 to 20 carbon atoms.

[3] A method for producing a thioester group-containing organosilicon compound according to [1] wherein a base compound (c) is used as a reaction catalyst.

[4] A method for producing a thioester group-containing organosilicon compound according to [3] wherein the base compound is a tertiary amine compound or a pyridine derivative.

[5] A thioester group-containing organosilicon compound represented by the following formula (3):

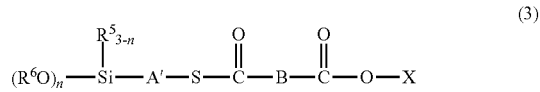

(3)

wherein A' is a straight, branched, or cyclic divalent hydrocarbon group; B is a straight, branched, or cyclic divalent hydrocarbon group; $R^5$ is independently an alkyl group containing 1 to 10 carbon atoms or an aryl group containing 6 to 10 carbon atoms; $R^6$ is independently an alkyl group containing 1 to 20 carbon atoms optionally having an intervening oxygen atom, an alkenyl group containing 2 to 10 carbon atoms, an aryl group containing 6 to 10 carbon atoms, or an acyl group containing 1 to 20 carbon atoms; X is hydrogen atom, an alkaline metal, or a structure represented by the following general formula (4):

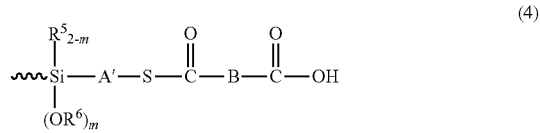

(4)

wherein wavy line represents a bond, and A', B, $R^5$, $R^6$, and m are as defined above; and n is as defined above.

[6] A thioester group-containing organosilicon compound according to [5] represented by the following formula (5):

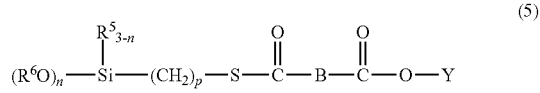

(5)

wherein $R^5$, $R^6$, B, and n are as defined above; p is an integer of 1 to 10; Y is hydrogen atom or a structure represented by the following general formula (6):

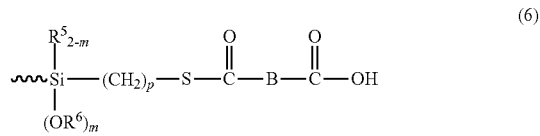

(6)

(wherein wavy line represents a bond, and $R^5$, $R^6$, B, m, and p are as defined above) formed by esterification between the carboxyl group and the hydrolyzable silyl group in the same or different molecule.

[7] A compounding agent for rubber containing the thioester group-containing organosilicon compound of the above [5] or [6].

[8] A compounding agent for rubber according to the above [7] further comprising (B) at least one powder at an amount such that weight ratio of the organosilicon compound (A) to the at least one powder (B) ((A)/(B)) is from 70/30 to 5/95.

[9] A rubber composition prepared by blending the compounding agent for rubber of the above [7] or [8].

[10] A tire produced by using a cured product of the rubber composition of the above [9].

ADVANTAGEOUS EFFECTS OF INVENTION

The method for producing a thioester group-containing organosilicon compound of the present invention generates reduced byproducts compared to prior art method, and the production efficiency is also higher. Compared to the conventional thioester group-containing organosilicon compound, the organosilicon compound having a hydrolyzable silyl group, a thioester group, and carboxyl group in the same molecule produced by such production method has realized improved reactivity and dispersibility near the silica simultaneously with reduced scorching during the vulcanization of the rubber composition due to the interaction with silica by the carboxyl group and the protective effect of the mercapto group by the thioester group. Furthermore, since the carboxyl group partly undergoes preliminary esterification with the hydrolyzable silyl group, generation of the VOC (volatile organic compound) in the hydrolysis of the silyl group is reduced, and hence, environmental load is also reduced. In addition, the tire prepared by using the rubber composition containing the organosilicon compound as described above as its compounding agent for rubber exhibits reduced hysteresis loss.

DESCRIPTION OF EMBODIMENTS

Next, the present invention is described in detail. In the present invention, "silane coupling agent" is included in "organosilicon compound".

The method for producing a thioester group-containing organosilicon compound of the present invention comprises the step of reacting (a) an organosilicon compound having mercapto group and hydrolyzable silyl group with (b) a carboxylic anhydride. This reaction does not involve formation of waste acid compound as in the case of conventional techniques, and accordingly, great reduction in the production cost is enabled since the separation step is no longer necessary.

In this method, the component (a) used is an organosilicon compound represented by the following formula (a), and the component (b) is a carboxylic anhydride represented by the following formula (b-1) or (b-2).

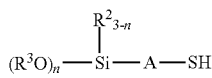
(a)

In the formula (a), $R^2$ is independently an alkyl group containing 1 to 10 carbon atoms or an aryl group containing 6 to 10 carbon atoms, $R^3$ is independently an alkyl group containing 1 to 20 carbon atoms optionally intervened by oxygen atom, an alkenyl group containing 2 to 10 carbon atoms, an aryl group containing 6 to 10 carbon atoms, or an acyl group containing 1 to 20 carbon atoms, A is a straight, branched, or cyclic divalent hydrocarbon group, and n is an integer of 1 to 3.

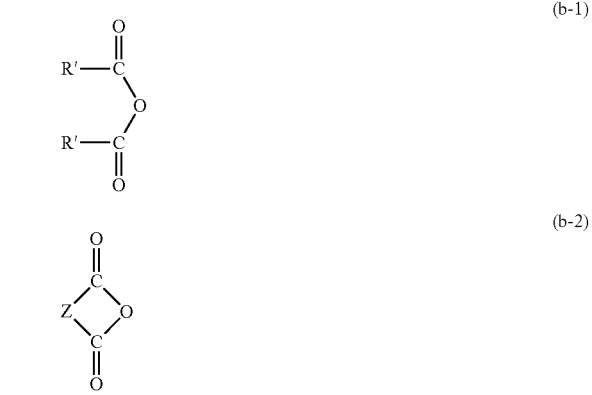

In the formula (b-1) and (b-2), R' is a monovalent hydrocarbon group containing 1 to 20 carbon atoms, and in particular, 1 to 10 carbon atoms such as a straight, branched, or cyclic alkyl group, a straight, branched, or cyclic alkenyl group, an aryl group, or an aralkyl group; and Z is a divalent hydrocarbon group containing 2 to 20 carbon atoms, and in particular, 2 to 10 carbon atoms such as a straight, branched, or cyclic alkylene group, a straight, branched, or cyclic alkenylene group, an arylene group, or an aralkylene group.

Reaction of the organosilicon compound of the formula (a) with the carboxylic anhydride of the formula (b-1) provides a thioester group-containing organosilicon compound represented by the following formula (1-1):

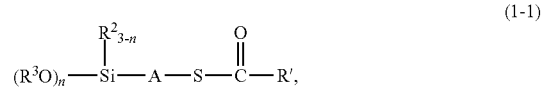

a thioester group-containing organosilicon compound represented by the following formula (1-2):

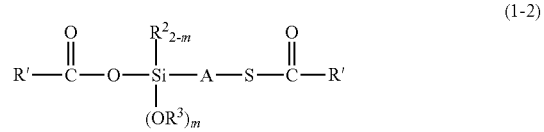

wherein m is 0, 1, or 2, or a mixture of the compounds of the formulae (1-1) and (1-2).

The reaction of the organosilicon compound of the formula (a) with the carboxylic anhydride of the formula (b-2) provides a compound represented by the following formula (1-3):

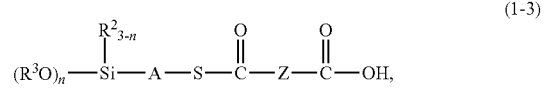

a compound represented by the following formula (1-4):

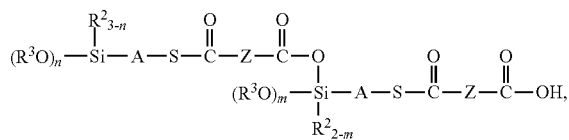

(1-4)

or a mixture of the compounds of formulae (1-3) and (1-4). The terminal COOH of the formula (1-4) may undergo the same esterification, and also, the terminal COON in the formulae (1-3) and (1-4) may react with the $OR^3$ in the same or different molecule to form a crosslinking.

Organosilicon Compound Having (a) Mercapto Group and Hydrolyzable Silyl Group

The organosilicon compound (a) having mercapto group and a hydrolyzable silyl group (hereinafter also referred to as a mercapto group-containing silane coupling agent) is not particularly limited as long as it is a compound known as a mercapto group-containing silane coupling agent, and examples include α-mercaptomethyltrimethoxysilane, α-mercaptomethylmethyldimethoxysilane, α-mercaptomethyldimethylmethoxysilane, α-mercaptomethyltriethoxysilane, α-mercaptomethylmethyldiethoxysilane, α-mercaptomethyldimethylethoxysilane, γ-mercaptopropyltrimethoxysilane, γ-mercaptopropylmethyldimethoxysilane, γ-mercaptopropyldimethylmethoxysilane, γ-mercaptopropyltriethoxysilane, γ-mercaptopropylmethyldiethoxysilane, and γ-mercaptopropyldimethylethoxysilane. In view of commercial availability and toxicity of the VOC (volatile organic compound) formed in the hydrolysis, the preferred are γ-mercaptopropyltriethoxysilane, γ-mercaptopropylmethyldiethoxysilane, and γ-mercaptopropyldimethylethoxysilane, and the more preferred are γ-mercaptopropyltriethoxysilane and γ-mercaptopropylmethyldiethoxysilane.

(b) Carboxylic Acid Anhydride

The carboxylic anhydride (b) is not particularly limited as long as it is a compound having a carboxylic anhydride structure. Non-limited examples of such compound which is commercially available as a reagent or the like include anhydrides of a saturated aliphatic carboxylic acid such as acetic anhydride, propionic anhydride, butyric anhydride, valeric anhydride, caproic anhydride, caprylic anhydride, lauric anhydride, stearic anhydride, oxalic anhydride, malonic anhydride, and succinic anhydride, anhydrides of an unsaturated aliphatic carboxylic acid such as allylsuccinic anhydride, maleic anhydride, oleic anhydride, linolenic anhydride, and linoleic anhydride, anhydrides of an aromatic carboxylic acid such as benzoic anhydride, phthalic anhydride, isophthalic anhydride, and terephthalic anhydride.

Reaction Ratio

In the method for producing a thioester group-containing organosilicon compound of the present invention, the organosilicon compound having mercapto group and a hydrolyzable silyl group (a) and the carboxylic anhydride (b) are blended so that 0.7 to 2.0 mol, and in particular, 0.9 to 1.5 mol of the carboxylic anhydride group is reacted with 1 mol of the mercapto group in view of reactivity and productivity. When the amount of the organosilicon compound having mercaptoto group and a hydrolyzable silyl group is excessively low, carboxylic anhydride may remain in the reaction mixture, and this may lead to damages caused by the carboxylic anhydride after the incorporation as a compounding agent for rubber. On the other hand, excessive incorporation of the organosilicon compound having mercaptoto group and a hydrolyzable silyl group may result in an increased risk of scorching when incorporation as a compounding agent for rubber.

(c) Reaction Catalyst

If desired, a reaction catalyst (c) may be used in the method for producing a thioester group-containing organosilicon compound of the present invention. The catalyst may be a commonly used Lewis base compound, and the preferred are tertiary amine compounds, pyridines, and their derivatives. The most preferred are dimethylaminopyridine (DMAP) and diazabicycloundecene (DBU) in view of their catalytic activity.

The catalyst is preferably used at an amount of 0.00001 to 1 mol, and more preferably at 0.0001 to 0.01 mol in relation to 1 mol of the mercapto group-containing silane coupling agent. Excessive use of the catalyst is uneconomical due to the saturation of the effect while use of an excessively small amount of the catalyst results in the insufficient effect, and hence, insufficient reaction speed and reduced productivity.

Solvent

If desired, a solvent may be used in the method for producing the thioester group-containing organosilicon compound of the present invention. The solvent used is not particularly limited as long as it does not react with the mercapto group-containing silane coupling agent and the carboxylic anhydride used as the starting materials. Exemplary such solvents include aliphatic hydrocarbon solvents such as pentane, hexane, heptane, and decane, ether solvents such as diethylether, tetrahydrofuran, and 1,4-dioxane, amide solvents such as formamide, dimethylformamide, and N-methylpyrrolidone, and aromatic hydrocarbon solvents such as benzene, toluene, and xylene.

Reaction Temperature

In the present invention, the component (a) and the component (b) may be reacted at a reaction temperature of preferably 20 to 150° C., more preferably 30 to 130° C., and most preferably 40 to 110° C. When the reaction temperature is too low, reaction speed will be insufficient and productivity will be reduced while use of excessively high reaction temperature is uneconomical since increase in the reaction speed will be saturated at such temperature.

Reaction Time

In the present invention, the reaction time of the component (a) and the component (b) is not particularly limited as long as the reaction is fully completed. The reaction time is preferably about 10 minutes to 24 hours, and more preferably about 1 to 10 hours.

Reaction of the mercapto group and the acid anhydride group results in the formation of thioester bond, and this means that a production method of the thioester group-containing organosilicon compound not requiring the treatment of the waste acid compound as required in the conventional method has been realized.

The compound produced by the production method of the present invention is the compound represented by the following general formula (1):

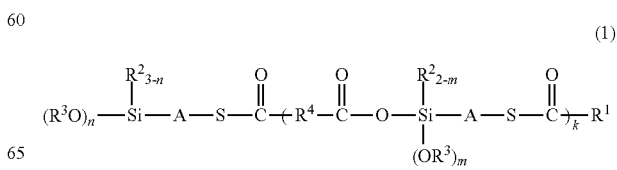

(1)

Herein, $R^1$ is an unsubstituted monovalent hydrocarbon group or a substituted monovalent hydrocarbon group with a substituent selected from carboxyl group, metal carboxylate salt group, and carboxylate ester group. $R^2$ is independently an alkyl group containing 1 to 10 carbon atoms or an aryl group containing 6 to 10 carbon atoms. $R^3$ is independently an alkyl group containing 1 to 20 carbon atoms optionally intervened with oxygen atom, an alkenyl group containing 2 to 10 carbon atoms, an aryl group containing 6 to 10 carbon atoms, or an acyl group containing 1 to 20 carbon atoms, A is a straight, branched, or cyclic divalent hydrocarbon group, and n is 1 to 3, and preferably 2 or 3. $R^4$ is a divalent hydrocarbon group, m is 0, 1, or 2, preferably 1 or 2, and k is an integer of 1 to 10, preferably 0 or 1, more preferably 0.

When the substituent of the $R^1$ in the structure is carboxyl group, esterification (removal of $R^3OH$) may occur between the carboxyl group and the hydrolyzable silyl group in the same or different molecule. Similar esterification (removal of $R^3OH$) may also occur at the terminal OH group with the $OR^3$ in the same or different molecule to form a crosslinking.

In the above formula, A is a straight, branched, or cyclic divalent hydrocarbon group preferably containing 1 to 20, and more preferably 1 to 10 carbon atoms. Exemplary non-limiting such groups include aliphatic hydrocarbon groups (and in particular, alkylene groups) such as methylene group, ethylene group, propylene group, and isopropylene group and divalent aromatic hydrocarbon groups (and in particular, arylene groups) such as phenylene group, naphthylene group and biphenylene group. Most preferably, A is an alkylene group having 2 to 6 carbon atoms.

$R^1$ is preferably an unsubstituted or substituted monovalent hydrocarbon group preferably containing 1 to 20, and more preferably 1 to 10 carbon atoms. Exemplary non-limiting unsubstituted monovalent hydrocarbon groups include straight, branched, or cyclic alkyl groups such as methyl group, ethyl group, propyl group, heptyl group, octyl group, and octadecyl group; aryl groups such as phenyl group; straight, branched, or cyclic alkenyl groups such as vinyl group and allyl group, and; aralkyl groups such as benzyl group. The substituted monovalent hydrocarbon group is any one of such unsubstituted monovalent hydrocarbon groups having at least one substituent selected from carboxyl group, metal carboxylate salt group, and carboxylate ester group containing 1 to 20 carbon atoms introduced in its C—H moiety. Exemplary non-limiting substituents include COOH group. Most preferably, $R^1$ is an alkyl group having 1 to 10 carbon atoms.

$R^2$ is an alkyl group containing 1 to 10, preferably 1 to 6 carbon atoms or an aryl group containing 6 to 10 carbon atoms. Non-limited examples include methyl group, ethyl group, and phenyl group. Most preferably, $R^2$ is an alkyl group having 1 to 3 carbon atoms.

$R^3$ is an alkyl group containing 1 to 20, preferably 1 to 18 carbon atoms optionally intervened by oxygen atom, an alkenyl group containing 2 to 10, preferably 2 to 8 carbon atoms, an aryl group containing 6 to 10 carbon atoms, or an acyl groups containing 1 to 20 carbon atoms. Non-limiting examples include methyl group, ethyl group, propyl group, propenyl group, phenyl group, acetyl group, and alkyloxyalkyl groups such as methoxyethyl group, and ethoxyethyl group. Most preferably, $R^3$ is an alkyl group having 1 to 3 carbon atoms.

$R^4$ is a divalent hydrocarbon group formed by removal of one hydrogen atom from the monovalent hydrocarbon group as mentioned above for $R^1$. Most preferably, $R^4$ is an alkylene group having 1 to 10 carbon atoms.

The organosilicon compound obtained by the production method of the present invention is preferably the one containing the following structures (functional groups) (i) to (iii):

(i) a hydrolyzable silyl group,
(ii) a thioester structure, and
(iii) carboxyl group or its alkali metal salt group. in the same molecule.

An example of the organosilicon compound containing the structures (i) to (iii) is the one represented by the following formula (3):

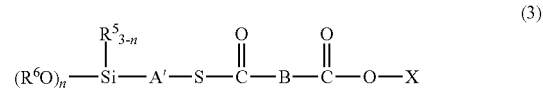

(3)

Herein, A' is a straight, branched, or cyclic divalent hydrocarbon group, B is a straight, branched, or cyclic divalent hydrocarbon group, and $R^5$ is independently an alkyl group containing 1 to 10 carbon atoms or an aryl group containing 6 to 10 carbon atoms. $R^6$ is independently an alkyl group containing 1 to 20 carbon atoms optionally intervened by oxygen atom, an alkenyl group containing 2 to 10 carbon atoms, an aryl group containing 6 to 10 carbon atoms, or an acyl group containing 1 to 20 carbon atoms. X is hydrogen atom or alkaline metal such as sodium or potassium, n is as defined above.

When X is H in the structure as described above (namely, when the structure has carboxyl group), esterification (removal of $R^6OH$) may occur between the carboxyl group and the hydrolyzable silyl group in the same or different molecule, and the resulting structure may be represented by the following general formula (4):

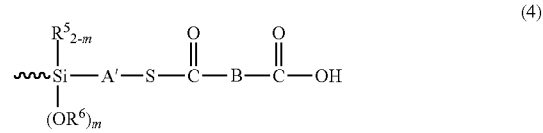

(4)

wherein $R^5$, $R^6$, A', B, and m are as defined above, and wavy line is a bond. Similar esterification (removal of $R^6OH$) may also occur at the terminal OH group of the formula (4) with the $OR^6$ in the same or different molecule to form crosslinking.

Use of the product obtained by the esterification reaction as described above for the compounding agent of the silica-containing rubber composition is preferable since this product does has no adverse effects on the physical properties of the rubber, and since the $R^6OH$ component generated in the reaction with the silica will be preliminarily removed and this contributes to the reduction of the VOC (volatile organic compound) in the rubber composition.

With regard to the structure, another example is a thioester group-containing organosilicon compound represented by the following general formula (5):

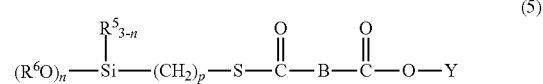

(5)

wherein $R^5$, $R^6$, B and n are as defined above, p is an integer of 1 to 10, preferably 2 to 8, and Y is hydrogen atom or a structure represented by the following general formula (6).

More specifically, the thioester group-containing organosilicon compound is represented by the following general formula (5a):

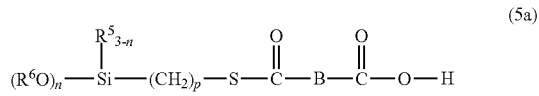

wherein $R^5$, $R^6$, B, n and p are as defined above, and/or is represented by the formula (5a) wherein the carboxyl group has bonded to the hydrolyzable silyl group in the same molecule or different molecule to form an intramolecular and/or intermolecular transesterification product of the organosilicon compound having thioester group and carboxyl group having structure represented by the following general formula (6):

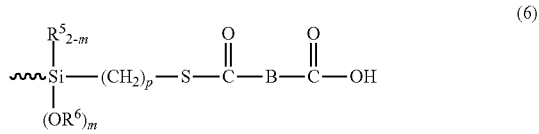

(wherein $R^5$, $R^6$, B, m, and p are as defined above, and wavy line is a bond and especially represents the intramolecule or intermolecule bonding site) in the molecule and/or between the molecule. Similar esterification may also occur at the terminal OH group of the formula (6) with the $OR^6$ in the same or different molecule to form a crosslinking.

In the above formula, A' is a straight, branched, or cyclic divalent hydrocarbon group preferably containing 1 to 20 carbon atoms, and more preferably 2 to 18 carbon atoms. Examples include those mentioned above for the A. Most preferably, A' is an alkylene group having 2 to 6 carbon atoms.

B is a straight, branched, or cyclic divalent hydrocarbon group preferably containing 1 to 20 carbon atoms, and more preferably 2 to 18 carbon atoms. Exemplary non-limiting divalent hydrocarbon groups include alkylene groups such as ethylene group and propylene group and arylene group such as phenylene group. Most preferably, B is a straight, branched, or cyclic alkylene group of 1 to 6 carbon atoms and alkenylene group of 2 to 8 carbon atoms, and phenylene group.

$R^5$ is an alkyl group containing 1 to 10, and preferably 1 to 6 carbon atoms or an aryl group containing 6 to 10 carbon atoms, and non-limiting examples include methyl group, ethyl group, and phenyl group. More preferably, $R^5$ is an alkyl group having 1 to 3 carbon atoms.

$R^6$ is an alkyl group containing 1 to 20, and preferably 1 to 18 carbon atoms optionally intervened with oxygen atom, an alkenyl group containing 2 to 10, and preferably 2 to 8 carbon atoms, an aryl group containing 6 to 10 carbon atoms, or an acyl group containing 1 to 20 carbon atoms. The alkyl group intervened with oxygen atom includes an alkoxyalkyl group. Exemplary non-limiting groups include methyl group, ethyl group, propyl group, propenyl group, phenyl group, acetyl group, and alkyloxyalkyl groups such as methoxyethyl group and ethoxyethyl group. Most preferably, $R^6$ is an alkyl group having 1 to 3 carbon atoms.

The compounding agent for rubber of the present invention contains the thioester group-containing organosilicon compound (A) as described above. The thioester group-containing organosilicon compound (A) of the present invention may also be preliminarily blended with at least one powder (B), and then used as a compounding agent for rubber. Examples of the powder (B) include carbon black, talc, calcium carbonate, stearic acid, silica, aluminum hydroxide, alumina, and magnesium hydroxide which are commonly used as a filler in various rubber composition. In view of the reinforcement performance, the preferred are silica and aluminum hydroxide, and the most preferred is silica.

The powder (B) may be blended at a weight ratio of the component (A)/the component (B) of 70/30 to 5/95, and more preferably 60/40 to 10/90. When the amount of the powder (B) is too small, the resulting compounding agent for rubber will be liquid, and introduction into the rubber kneader may become difficult. When the amount of the powder (B) is too large, volume of the entire rubber will be too large in relation to the effective amount of the compounding agent for rubber, and this in turn results in the increased transportation cost.

The compounding agent for rubber of the present invention may also contain a fatty acid, fatty acid salt, an organic polymer or a rubber such as polyethylene, polypropylene, polyoxyalkylene, polyester, polyurethane, polystyrene, polybutadiene, polyisoprene, natural rubber, or styrene-butadiene copolymer, and an additive commonly blended in tire or other rubbers such as vulcanizer, crosslinking agent, vulcanization accelerator, crosslinking accelerator, oil, antiaging agent, filler, plasticizer, or the like at an amount not adversely affecting the objects of the present invention. In addition, the compounding agent for rubber of the present invention may be either in the form of liquid, solid, dilution or emulsion in an organic solvent.

Use of the rubber-compounding agent of the present invention is preferable for a silica-containing rubber composition.

In this case, the compounding agent for rubber is used at an amount in terms of the organosilicon compound of the present invention of 0.2 to 30 parts by weight, and in particular, at 1 to 20 parts by weight in relation to 100 parts by weight of the filler (the entire filler containing the powder (B)) blended in the rubber composition. The desired rubber property may not be obtained when the organosilicon compound is added at an excessively small amount while excessive addition is uneconomical due to the saturation of the effect in relation to the amount added.

The rubber blended as the main component in the rubber composition prepared by using the compounding agent for rubber of the present invention may be any rubber which has been commonly blended in the rubber composition, for example, natural rubber (NR), a diene rubber such as isoprene rubber (IR), a styrene-butadiene copolymer rubber (SBR), a polybutadiene rubber (BR), an acrylonitrile-butadiene copolymer rubber (NBR), and a butyl rubber (IIR), an ethylene-propylene copolymer rubber (EPR, EPDM), which may be used alone or as a blend of two or more. Exemplary fillers blended in the composition include silica, talc, clay, aluminum hydroxide, magnesium hydroxide, calcium carbonate, and titanium oxide. The filler in total containing the powder (B) is preferably added at an amount of 20 to 2,000 parts by weight, and in particular 40 to 1,000 parts by weight in relation to 100 parts by weight of the rubber.

In addition to the critical components as described above, the rubber composition containing the compounding agent for rubber of the present invention may also contain various additives such as a vulcanizer, crosslinking agent, vulcanization accelerator, crosslinking accelerator, oil, antiaging agent, filler, plasticizer and the like commonly blended in the tire as well as other common rubbers. These additives may be added at an amount commonly used in the art not detracting from the objects of the present invention.

In the rubber composition as described above, the organosilicon compound of the present invention may also be used instead of the known silane coupling agent. However, another silane coupling agent may be optionally added to the extent not adversely affecting the objects of the present invention. Such silane coupling agent used may be any agent which has been used with a silica filler, and typical examples include vinyltrimethoxysilane, vinyltriethoxysilane, γ-glycidoxypropyltrimethoxysilane, γ-glycidoxypropyltriethoxysilane, γ-aminopropyltriethoxysilane, β-aminoethyl-γ-aminopropyltrimethoxysilane, β-aminoethyl-γ-aminopropyltriethoxysilane, γ-mercaptopropyltrimethoxysilane, γ-mercaptopropyltriethoxysilane, γ-methacryloxypropyltrimethdxysilane, γ-methacryloxypropyltriethoxysilane, γ-acryloxypropyltrimethoxysilane, γ-acryloxypropyltriethoxysilane, bis-triethoxysilylpropyl tetrasulfide, and bis-triethoxysilylpropyl disulfide.

The rubber composition prepared by blending the compounding agent for rubber of the present invention may be prepared by kneading in a method commonly used in the art to prepare the composition, and the composition may be used for vulcanization or crosslinking conducted under the conditions normally used in the art.

The tire of the present invention is prepared by using the rubber composition as described above, and the cured product of the rubber composition as described above is preferably used for the tread. The tire of the present invention has markedly reduced rolling resistance as well as a remarkably reduced abrasion resistance. The tire of the present invention is not particularly limited for its structure as long as it is a conventional known structure, and the tire may be produced by a method commonly used in the art. When the tire of the present invention is a pneumatic tire, examples of the gas filled in the tire may be normal air and air having an adjusted oxygen partial pressure, and inert gases such as nitrogen, argon, and helium.

EXAMPLES

Next, the present invention is described in further detail by referring to Examples and Comparative Examples, which by no means limit the scope of the present invention. In the following Examples, "part" means "part by weight" and the viscosity, the specific weight, and the refractive index are values measured at 25° C. GC is an abbreviation for gas chromatography, and NMR is an abbreviation of nuclear magnetic resonance spectroscopy. The viscosity is based on the measurement at 25° C. using a capillary dynamic viscometer.

Example 1

A 1 L separable flask equipped with an agitator, a reflux condenser, a dropping funnel, and a thermometer was charged with 102.1 g (1.0 mol) of acetic anhydride, 1.0 g (0.01 mol) of N,N-dimethylaminopyridine, and 300 g of toluene, and the mixture was heated to 70° C. in an oil bath. To this mixture, 243.2 g (1.0 mol) of γ-mercaptopropyltriethoxysilane (KBE-803 manufactured by Shin-Etsu Chemical Co., Ltd.) was added dropwise, and then, the mixture was stirred for 2 hours by heating to 70° C. Reaction was completed after confirming the complete disappearance of the peak from the mercaptosilane of the starting material and appearance of the peak from the thioesterified moiety by GC. The reaction solution was distilled at reduced pressure to remove toluene and obtain a colorless transparent liquid (yield, 310.7 g). The thus obtained reaction product had a viscosity of 2.7 mm$^2$/s, a specific weight of 1.026, and a refractive index of 1.477. $^1$H NMR spectrum revealed that the reaction product was a mixture of the compounds represented by the following chemical structural formulae (7) and (8):

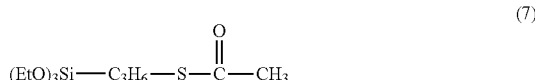

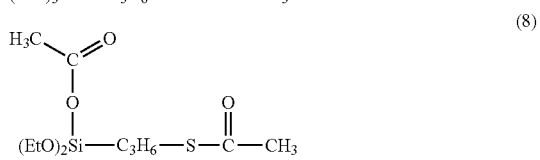

wherein Et in these and in the following formulae represents ethyl group. The mixed ratio was (7)/(8)=85/15 as molar ratio from NMR.

Example 2

A 1 L separable flask equipped with an agitator, a reflux condenser, a dropping funnel, and a thermometer was charged with 270.4 g (1.0 mol) of octanoic anhydride, 1.0 g (0.01 mol) of N,N-dimethylaminopyridine, and 300 g of toluene, and the mixture was heated to 70° C. in an oil bath. To this mixture, 243.2 g (1.0 mol) of γ-mercaptopropyltriethoxysilane (KBE-803 manufactured by Shin-Etsu Chemical Co., Ltd.) was added dropwise, and then, the mixture was stirred for 2 hours by heating to 70° C. Reaction was completed after confirming the complete disappearance of the peak from the mercaptosilane of the starting material and appearance of the peak from the thioesterified moiety by GC. The reaction solution was distilled at reduced pressure to remove toluene and obtain a yellow transparent liquid (yield, 416.1 g). The thus obtained reaction product had a viscosity of 250.7 mm$^2$/s, a specific weight of 1.031, and a refractive index of 1.484. $^1$H NMR spectrum revealed that the reaction product was a mixture of the compounds represented by the following chemical structural formulae (9) and (10):

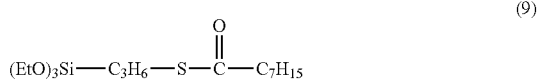

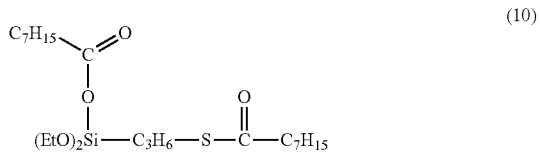

The mixed ratio was (9)/(10)=90/10 as molar ratio from NMR.

Example 3

A 1 L separable flask equipped with an agitator, a reflux condenser, a dropping funnel, and a thermometer was charged with 100.1 g (1.0 mol) of succinic anhydride, 1.0 g (0.01 mol) of N,N-dimethylaminopyridine, and 300 g of toluene, and the mixture was heated to 70° C. in an oil bath. To this mixture, 243.2 g (1.0 mol) of γ-mercaptopropyltriethoxysilane (KBE-803 manufactured by Shin-Etsu Chemical Co., Ltd.) was added dropwise, and then, the mixture was stirred for 2 hours by heating to 70° C. Reaction was completed after confirming the complete disappearance of the peak from the mercaptosilane of the starting material by GC. The reaction solution was distilled at reduced pressure to remove toluene and obtain a colorless transparent liquid (yield, 326.2 g). The thus obtained reaction product had a viscosity of 232 $mm^2/s$, a specific weight of 1.029, and a refractive index of 1.483. $^1H$ NMR spectrum revealed that the reaction product was a mixture of the compounds represented by the following chemical structural formulae (11) and (12):

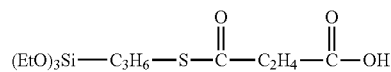
(11)

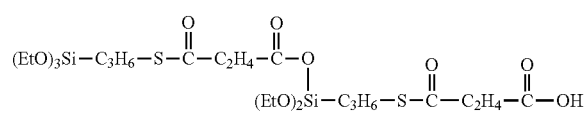
(12)

The mixed ratio was (11)/(12)=75/25 as molar ratio from NMR.

Example 4

A 1 L separable flask equipped with an agitator, a reflux condenser, a dropping funnel, and a thermometer was charged with 140.1 g (1.0 mol) of allylsuccinic anhydride, 1.0 g (0.01 mol) of N,N-dimethylaminopyridine, and 300 g of toluene, and the mixture was heated to 70° C. in an oil bath. To this mixture, 243.2 g (1.0 mol) of γ-mercaptopropyltriethoxysilane (KBE-803 manufactured by Shin-Etsu Chemical Co., Ltd.) was added dropwise, and then, the mixture was stirred for 2 hours by heating to 70° C. Reaction was completed after confirming the complete disappearance of the peak from the mercaptosilane of the starting material by GC. The reaction solution was distilled at reduced pressure to remove toluene and obtain a pale yellow transparent liquid (yield, 364.1 g). The thus obtained reaction product had a viscosity of 181 $mm^2/s$, a specific weight of 1.039, and a refractive index of 1.453. $^1H$ NMR spectrum revealed that the reaction product was a mixture of the compounds represented by the following chemical structural formulae (13) and (14):

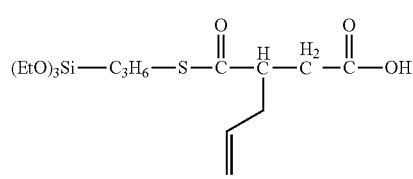
(13)

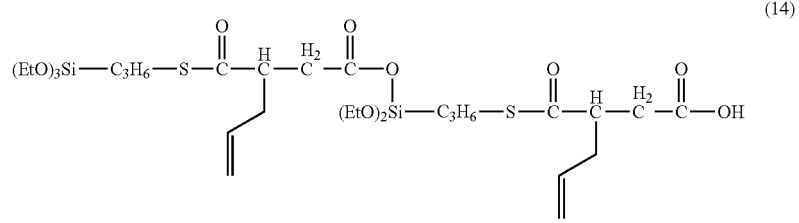
(14)

The mixed ratio was (13)/(14)=80/20 as molar ratio from NMR.

Example 5

A 1 L separable flask equipped with an agitator, a reflux condenser, a dropping funnel, and a thermometer was charged with 148.1 g (1.0 mol) of phthalic anhydride, 1.0 g (0.01 mol) of N,N-dimethylaminopyridine, and 300 g of toluene, and the mixture was heated to 70° C. in an oil bath. To this mixture, 243.2 g (1.0 mol) of γ-mercaptopropyltriethoxysilane (KBE-803 manufactured by Shin-Etsu Chemical Co., Ltd.) was added dropwise, and then, the mixture was stirred for 2 hours by heating to 70° C. Reaction was completed after confirming the complete disappearance of the peak from the mercaptosilane of the starting material by GC. The reaction solution was distilled at reduced pressure to remove toluene and obtain a yellow transparent liquid (yield, 371.7 g). The thus obtained reaction product had a viscosity of 881 $mm^2/s$, a specific weight of 1.040, and a refractive index of 1.493. $^1H$ NMR spectrum revealed that the reaction product was a mixture of the compounds represented by the following chemical structural formulae (15) and (16):

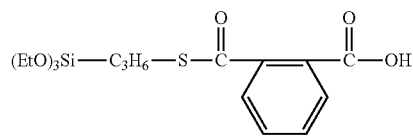
(15)

-continued

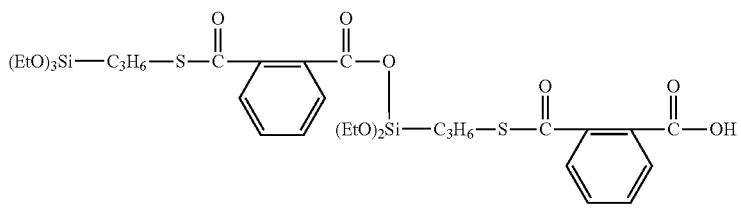
(16)

The mixed ratio was (15)/(16)=95/5 as molar ratio from NMR.

Examples 6 to 10 and Comparative Examples 1 to 3

110 parts of oil-extended emulsion polymer SBR (#1712 manufactured by JSR), 20 parts of NR(RSS#3 normal grade), 20 parts of carbon black (N234 normal grade), 50 parts of silica (Nipsil AQ manufactured by Nihon Silica Industries), 6.5 parts of a thioester group-containing organosilicon compound of Examples 1 to 5 or Comparative Compound A to C, 1 part of stearic acid, and 1 part of antiaging agent 6C (Noclack 6C manufactured by Ouchi Shinko Chemical Industrial Co., Ltd.) were blended to prepare a master batch. To this, 3.0 parts of zinc oxide, 0.5 part of vulcanizing accelerator DM (dibenzothiazyl disulfide), 1.0 part of vulcanizing accelerator NS (N-t-butyl-2-benzothiazolyl sulfenamide), and 1.5 parts of sulfur were added, and the mixture was kneaded to prepare a rubber composition.

Next, the rubber composition before the vulcanization and after the vulcanization under the conditions of 165° C. for 30 minutes was measured by the procedure as described below. The results are shown in Tables 1 and 2.

Physical Properties Before the Vulcanization (1) Mooney Viscosity

Mooney viscosity was measured according to JIS K 6300 by preheating for 1 minute, and measuring for 4 minutes at a temperature of 130° C., and the result was indicated by an index in relation to Comparative Example 1 at the index of 100. Lower value of the index indicates lower Mooney viscosity, and hence, higher workability.

Physical Properties after the Vulcanization (2) Dynamic Viscoelasticity

Dynamic viscoelasticity was measured by using a viscoelastometer (manufactured by Rheometrix) under the conditions of tensile dynamic strain of 5%, frequency of 15 Hz, and 60° C. The test piece used was a sheet having a thickness of 0.2 cm and a width of 0.5 cm, and the chuck distance was 2 cm with the initial load of 160 g. The value of tan δ was indicated by an index in relation to Comparative Example 1 at the index of 100. Lower value of the index indicates lower hysteresis loss, and hence, lower exothemicity.

(3) Abrasion Resistance

Abrasion resistance was measured according to JIS K 6264-2: 2005 by using Lambourn abrasion tester under the conditions of room temperature and a slip ratio 25%. The result was indicated as the inverse of the abrasion amount by an index in relation to Comparative Example 1 at the index of 100. Larger value of the index indicates smaller abrasion, and hence, higher abrasion resistance.

$(EtO)_3Si-C_3H_6-S_4-C_3H_6-Si(OEt)_3$  Comparative Compound A

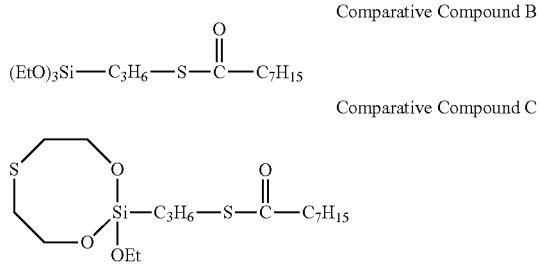

TABLE 1

| Formulation (part by weight) | | Example | | | | |
|---|---|---|---|---|---|---|
| | | 6 | 7 | 8 | 9 | 10 |
| SBR | | 110.0 | 110.0 | 110.0 | 110.0 | 110.0 |
| NR | | 20.0 | 20.0 | 20.0 | 20.0 | 20.0 |
| Carbon black | | 20.0 | 20.0 | 20.0 | 20.0 | 20.0 |
| Silica | | 50.0 | 50.0 | 50.0 | 50.0 | 50.0 |
| Stearic acid | | 1.0 | 1.0 | 1.0 | 1.0 | 1.0 |
| 6C | | 1.0 | 1.0 | 1.0 | 1.0 | 1.0 |
| Zinc oxide | | 3.0 | 3.0 | 3.0 | 3.0 | 3.0 |
| DM | | 0.5 | 0.5 | 0.5 | 0.5 | 0.5 |
| NS | | 1.0 | 1.0 | 1.0 | 1.0 | 1.0 |
| Sulfur | | 1.5 | 1.5 | 1.5 | 1.5 | 1.5 |
| Compound of Example 1 | | 6.5 | — | — | — | — |
| Compound of Example 2 | | — | 6.5 | — | — | — |
| Compound of Example 3 | | — | — | 6.5 | — | — |
| Compound of Example 4 | | — | — | — | 6.5 | — |
| Compound of Example 5 | | — | — | — | — | 6.5 |
| Physical properties before the vulcanization | Mooney viscosity | 98 | 97 | 96 | 96 | 96 |
| Physical properties after the vulcanization | Dynamic viscoelasticity tan δ (60° C.) | 97 | 97 | 95 | 95 | 96 |
| | Abrasion resistance | 103 | 103 | 105 | 106 | 105 |

TABLE 2

| Formulation (part by weight) | Comparative Example | | |
|---|---|---|---|
| | 1 | 2 | 3 |
| SBR | 110.0 | 110.0 | 110.0 |
| NR | 20.0 | 20.0 | 20.0 |
| Carbon black | 20.0 | 20.0 | 20.0 |
| Silica | 50.0 | 50.0 | 50.0 |
| Stearic acid | 1.0 | 1.0 | 1.0 |
| 6C | 1.0 | 1.0 | 1.0 |
| Zinc oxide | 3.0 | 3.0 | 3.0 |
| DM | 0.5 | 0.5 | 0.5 |
| NS | 1.0 | 1.0 | 1.0 |
| Sulfur | 1.5 | 1.5 | 1.5 |
| Comparative Compound A | 6.5 | — | — |
| Comparative Compound B | — | 6.5 | — |

TABLE 2-continued

| Formulation | | Comparative Example | | |
|---|---|---|---|---|
| (part by weight) | | 1 | 2 | 3 |
| Comparative Compound C | | — | — | 6.5 |
| Physical properties before the vulcanization | Mooney viscosity | 100 | 98 | 97 |
| Physical properties after the vulcanization | Dynamic viscoelasticity tan δ (60° C.) | 100 | 99 | 98 |
| | Abrasion resistance | 100 | 101 | 101 |

Japanese Patent Application No. 2011-109413 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A compounding agent for rubber, said compounding agent containing a thioester group-containing organosilicon compound (A) of formula (5)

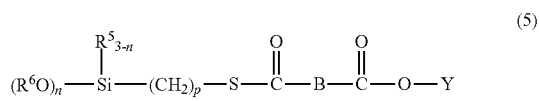

wherein:
R$^6$ is independently an alkyl group containing 1 to 20 carbon atoms optionally having an intervening oxygen atom, an alkenyl group containing 2 to 10 carbon atoms, an aryl group containing 6 to 10 carbon atoms, or an acyl group containing 1 to 20 carbon atoms;
n is an integer of 1 to 3;
R$^5$ is independently an alkyl group containing 1 to 10 carbon atoms or an aryl group containing 6 to 10 carbon atoms;
p is an integer of 1 to 10;
B is a straight, branched, or cyclic divalent hydrocarbon group; and
Y is a structure represented by formula (6)

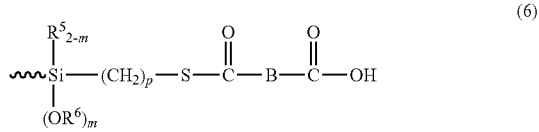

wherein: the wavy line represents a bond; m is 0, 1, or 2; and R$^5$, R$^6$, B, and p are as defined above, and
containing a thioester group-containing organosilicon compound (A) of formula (5a)

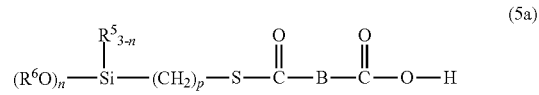

wherein R$^6$, n, R$^5$, p, and B are as defined above,
wherein said compounding agent is formed by esterification between a carboxyl group and a hydrolyzable silyl group in the same or a different molecule.

2. A compounding agent for rubber according to claim 1 further comprising
(B) at least one powder at an amount such that weight ratio of the organosilicon compound (A) to the at least one powder (B) ((A)/(B)) is from 70/30 to 5/95.

3. The compounding agent for rubber according to claim 2, wherein said powder weight ratio (A):(B) of the organosilicon compound (A) to the at least one powder (B) ranges from 60:40 to 10:90.

4. The compounding agent for rubber according to claim 2, wherein said powder is at least one member selected from the group consisting of carbon black, talc, calcium carbonate, stearic acid, silica, aluminum hydroxide, alumina, and magnesium hydroxide.

5. The compounding agent for rubber according to claim 4, wherein said powder is silica.

6. A rubber composition prepared by blending the compounding agent for rubber of claim 1.

7. A tire comprising a cured product of a rubber composition prepared by blending a compounding agent containing
(i) a thioester group-containing organosilicon compound (A) of formula (5)

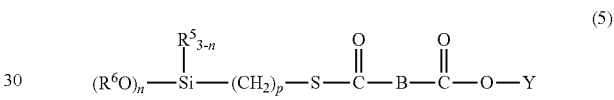

wherein: R$^6$ is independently an alkyl group containing 1 to 20 carbon atoms optionally having an intervening oxygen atom, an alkenyl group containing 2 to 10 carbon atoms, an aryl group containing 6 to 10 carbon atoms, or an acyl group containing 1 to 20 carbon atoms; n is an integer of 1 to 3; R$^5$ is independently an alkyl group containing 1 to 10 carbon atoms or an aryl group containing 6 to 10 carbon atoms; p is an integer of 1 to 10; B is a straight, branched, or cyclic divalent hydrocarbon group; and Y is a structure represented by formula (6)

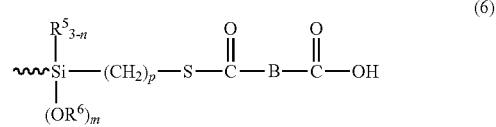

wherein: the wavy line represents a bond; m is 0, 1, or 2; and R$^5$, R$^6$, B, and p are as defined above, and
(ii) a thioester group-containing organosilicon compound (A) of formula (5a)

wherein R$^6$, n, R$^5$, p, and B are as defined above,
wherein said compounding agent is formed by esterification between a carboxyl group and a hydrolyzable silyl group in the same or a different molecule.

* * * * *